United States Patent
Burcham et al.

(10) Patent No.: US 9,971,637 B1
(45) Date of Patent: May 15, 2018

(54) BIG DATA PROPAGATION AGENT FRAMEWORK

(71) Applicant: Sprint Communications Company L.P., Overland Park, KS (US)

(72) Inventors: Robert H. Burcham, Overland Park, KS (US); Geoffrey A. Holmes, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 302 days.

(21) Appl. No.: 14/946,748

(22) Filed: Nov. 19, 2015

(51) Int. Cl.
- *G06F 3/00* (2006.01)
- *G06F 9/44* (2006.01)
- *G06F 9/46* (2006.01)
- *G06F 13/00* (2006.01)
- *G06F 9/54* (2006.01)
- *G06F 17/30* (2006.01)

(52) U.S. Cl.
CPC ........ *G06F 9/542* (2013.01); *G06F 17/30477* (2013.01)

(58) Field of Classification Search
None
See application file for complete search history.

(56) References Cited

U.S. PATENT DOCUMENTS

| | | | | |
|---|---|---|---|---|
| 2006/0143179 | A1* | 6/2006 | Draluk | H04L 63/20 |
| 2007/0050768 | A1* | 3/2007 | Brown | G06F 9/5027 |
| | | | | 718/100 |
| 2012/0284291 | A1* | 11/2012 | Brown | G06Q 10/00 |
| | | | | 707/756 |
| 2013/0191884 | A1* | 7/2013 | Leicher | H04L 63/08 |
| | | | | 726/4 |

\* cited by examiner

*Primary Examiner* — Chat Do
*Assistant Examiner* — William C Wood

(57) ABSTRACT

A data distribution computer system. The system comprises a data store, a non-transitory memory, a processor, and a data propagation application stored in the non-transitory memory. When executed by the processor, the application initiates execution of a plurality of data propagation agents in a restricted runtime environment and provides information to the agents identifying data that is available in the data store via a discovery application programming interface (API). The application further provides data from the data store to the agents via a data access API, where the data propagation application manages the scheduling of the agents and restricts the data in the data store that is propagated to the agents based on an access policy for each agent.

5 Claims, 3 Drawing Sheets

BIG DATA PROPAGATION AGENT FRAMEWORK

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Modern communication and computer systems make collection and mining of large volumes of data, which may sometimes be referred to as "big data," practical. The big data may pertain to any of a variety of items such as a large number of customer accounts, a large number of financial transactions, a large number of students, a large number of healthcare patients, a large number of medical events, and the like. The big data may be analyzed or "mined" to extract valuable information. Working with big data, creates challenges for traditional computing methods and architectures.

SUMMARY

In an embodiment, a data distribution computer system is disclosed. The system comprises a data store, a non-transitory memory, a processor, and a data propagation application stored in the non-transitory memory. When executed by the processor, the data propagation application initiates execution of a plurality of data propagation agents in a restricted runtime environment, provides information to the agents identifying data that is available in the data store via a discovery application programming interface (API), and provides data from the data store to the agents via a data access API. The data propagation application manages the scheduling of the agents and restricts the data in the data store that is propagated to the agents based on an access policy for each agent.

In another embodiment, a method of propagating data from a data store is disclosed. The method comprises receiving by an agent framework application a first request to execute a first number of instances of a first data propagation agent in an execution sandbox, wherein the agent framework application executes on a computer system and, responsive to receiving the first request, instantiating a number of instances of the first data propagation agent to run in an agent framework sandbox by the agent framework application that is less than the first number, whereby a parallelism of the first data propagation agent is restricted by the agent framework application. The method further comprises, in response to receiving by the agent framework application a request from an instance of a second data propagation agent to access an item of data stored in a data store, transmitting an access request rejection message by the agent framework application to the instance of the second data propagation agent on the grounds that the second data propagation agent is restricted from access to the item of data. The method further comprises providing a data-as-a-service interface to data propagation agents for receiving data propagated from the data store by the agent framework application, where the data provided by the agent framework application comprises a marked text document and scheduling execution of instances of data propagation agents to manage and maintain availability of data-as-a-service access to the data store.

In yet another embodiment, a federated data distribution computer system is disclosed. The system comprises a data store, a non-transitory memory, a processor, a data propagation application stored in the non-transitory memory. When executed by the processor, the data propagation application instantiates a plurality of data propagation agents in a restricted runtime environment, restricting the execution parallelism of the agents based on maintaining availability of data-as-a-service access to the data store, registers instantiated agents in an agent registry, and schedules execution of the agents listed in the agent registry. The application further establishes a communication connection with the data store, promotes discovery of data contained in the data store by extending a discovery application programming interface (API) to the agents, and brokers requests from the agents to read data from the data store, wherein the agents have no communication connection with the data store, and the data propagation application restricts access of agents based on a per-agent access policy. The application further reads data from the data store via the communication connection and provides the data read from the data store as a marked text document.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
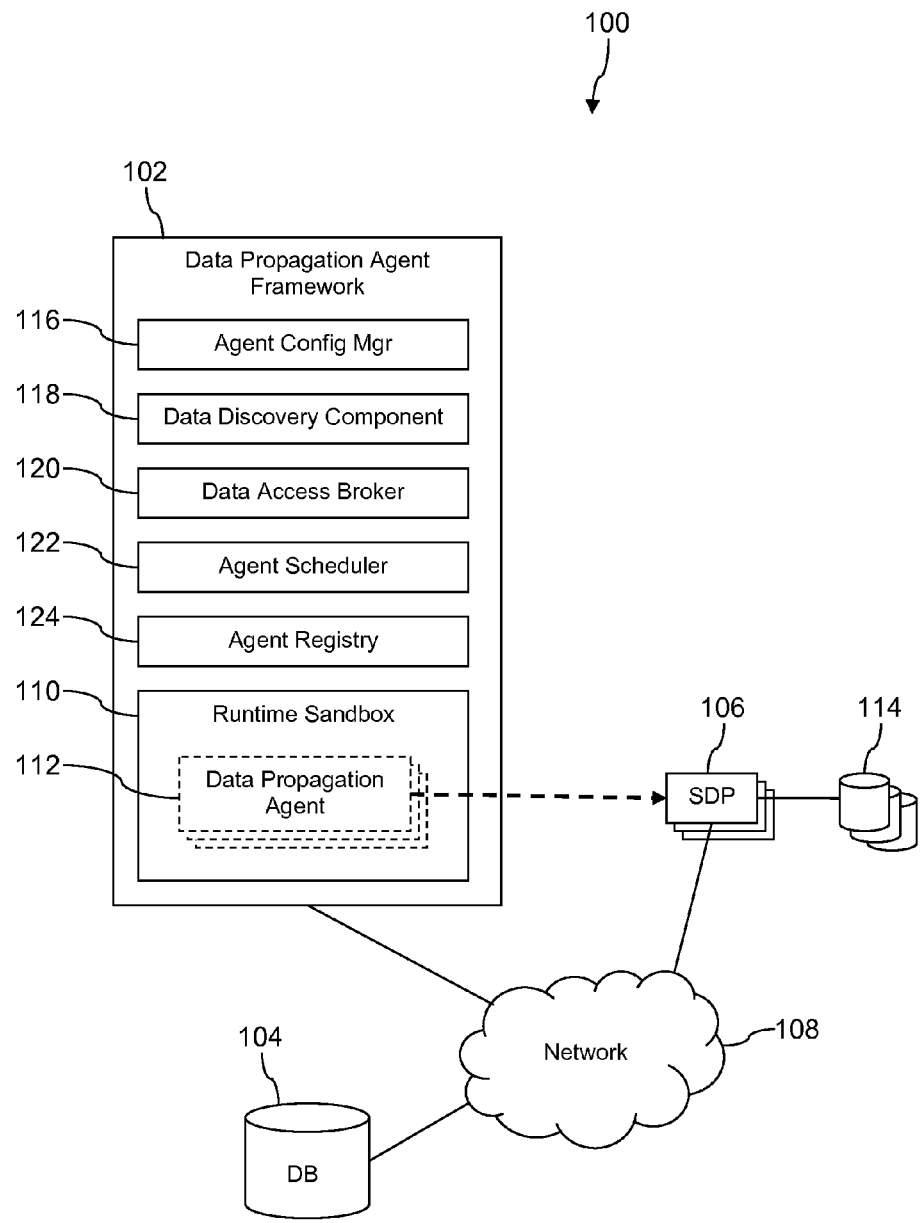
FIG. 1 is a block diagram of a computer system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A federated data distribution computer system is taught herein. A large data store is desirably accessed by each of a flexible number of independent and disparate consumers of data without blocking or delaying access of other data consumers to the data store. Further, the data access mechanism desirably need not be modified to support new data consumers; instead new data consumers conform themselves to the defined services and interfaces of the data access mechanism, and the data access mechanism enforces data access restrictions and policy on the data consumers.

For example, a data propagation application (e.g., a data access mechanism) registers data access agents in an agent registry. The data propagation application instantiates the agents based on desires of a data consumer and access restriction policies and schedules the agents for execution in a restricted runtime environment or a sandbox. The data propagation application may modulate a parallelism requested by the data consumers and/or the agents to provide equitable access of the data consumers and/or the agents to the data store. Equitable access of data consumers to the data store may be defined as providing an about equal throughput of data propagation per unit of time for each data consumer. Alternatively, equitable access may be defined as providing about equal throughput of data propagation per unit of time for data consumers belonging to a same service level. Other definitions of equitable access are also contemplated. For example, equitable access may be defined in terms of data request average queue depths or in terms of data request average pendency times of agents.

A number of agent instances per data consumer may be restricted by the data propagation application to try to achieve the equitable access among data consumers. The number of agent instances allowed by the data propagation application for data consumers may vary depending on a time varying load placed on the system by the data consumers. The data propagation application may command data consumers to terminate one or more of its agents as a load on the system grows or may itself terminate agents.

The data propagation application may send notifications to data consumers when spare system processing capacity is available and that additional instances of agents may be requested by data consumers. In an embodiment, the system may periodically reevaluate the system processing capacity and reduce or expand agent instances, for example every second, every ten seconds, every minute, or on some other periodic basis.

As an example, a data consumer may request 10 instances of its agent to be run in parallel, and the data propagation application may only instantiate 5 instances of that agent, in order to avoid stalling the access to data of other currently executing agents. Additionally the data propagation application schedules execution of the instances of the agents to provide equitable access by all data consumers and/or agents to the data store. The data propagation application may schedule instances of the agents to approach the goal of data consumers equitably sharing system resources and access to the data store as defined above, for example granting more or less execution duty cycles to agents of a data consumer based on the needs of other data consumers at that time. Alternatively, the data propagation application may schedule execution of the instances of agents to best fulfill service level agreements (SLAs) negotiated between the data consumers and the data propagation application on registration of the agents. The data propagation application may adapt the scheduling of agent instances on an on-going basis, for example every second, every ten seconds, every minute, or some other periodic basis.

The registration of agents is performed according to an application programming interface (API) extended by the data propagation application. The data consumer may identify how many parallel instances of the agent are desired to be instantiated in the API call that registers an agent. The data consumer and/or agent calls a discovery API extended by the data propagation application to identify types or classes of data available from the data store. The agent may then request data from one or more of the data classes via a data access API extended by the data propagation application. The data propagation application restricts the data types that an agent accesses based on an access policy defined for that specific agent and/or data consumer. The access policy of different agents may be different from each other, for example based on a service tier negotiated between the data propagation application and the data consumer that registers the agent. The data consumers may be associated with remote computer systems not controlled by the data propagation application. The data propagation application establishes data communication links with the data store and does not provide direct communication links between the agents and the data store. The data propagation application may be said to broker access of the agents and/or data consumers to the data store.

The federated data distribution computer system described in brief above can achieve a fair and balanced shared data use environment for loosely coupled, unaffiliated data consumers via their agents. The system can dynamically support the addition of new agents and/or data consumers without redesign, redevelopment, or retesting of the data propagation application and without substantive perturbation of the experience of more senior agents and/or data consumers. Further, the system can protect the integrity of the data encapsulated in the data store, for example by executing the agents in a controlled runtime environment or sandbox. As such, the federated data distribution computer system comprising the data propagation application taught by the present disclosure improves known computing machines and/or computer systems.

Turning now to FIG. 1, a federated data distribution system 100 is described. In an embodiment, the system 100 comprises a data propagation agent framework 102, a data store 104, a plurality of service delivery platforms (SDPs) 106, and a network 108. The data propagation agent framework 102 provides access to the data in the data store 104 to the SDPs 106 via data propagation agents 112 that execute in a runtime sandbox 110 within the agent framework 102. The network 108 comprises one or more public networks, one or more private networks, or a combination thereof. The SDPs 106 need not be affiliated with each other, coordinate with each other, or be aware of each other.

In an embodiment, the data propagation agent framework 102 comprises an agent configuration manager 116, a data discovery component 118, a data access broker 120, an agent scheduler 122, an agent registry 124, and the already mentioned runtime sandbox 110. The collectivity of the computer artifacts 110, 116, 118, 120, 122, and 124 may be said to constitute a data propagation application or an agent framework application. It is understood that in some embodiments the functionality ascribed to two or more of the computer artifacts 110, 116, 118, 120, 122, and 124 may be combined in a single computer artifact. Additionally, it is understood that one or more of the computer artifacts 110, 116, 118, 120, 122, and 124 may be provided by two or more separate components. Computer artifacts 110, 116, 118, 120, 122, and 124 execute on one or more computer systems. Computer systems are described further hereinafter. The data propagation agent framework 102 and/or a data propagation application and/or an agent framework application may be said to support federated data distribution to the agents 112.

The agents 112 may execute in the runtime sandbox 110 but are not formally components or constituents of the framework 102. Rather the framework 102 is adopted to receive executable files or images associated with the agents 112 from calls to an API provided by the framework 102 (i.e., calls invoked by the SDPs 106 to register and/or execute the agents 112) and execute the agents 112 in the runtime sandbox 110. In some contexts, the data propagation agent framework 102 may be said to provide a data-as-a-service functionality to the SDPs 106. In an embodiment, the SDPs 106 may provide their agents 112 to the data propagation agent framework 102 in a Java archive (JAR) file.

The SDP 106 may be referred to in some contexts as data consumers. The agents 112 retrieve data from the data store 104 via the framework 102, optionally format the shema-less data provided to the agents 112 by the framework 102, and sends the data to the corresponding SDP 106. The agents 112 and/or the SDPs 106 may store the retrieved data consumer data stores 114, and the SDPs 106 may process or mine the data by reading out of the consumer data stores 114. Each SDP 106 may develop and register distinct and/or different agents 112 (i.e., different from the agents 112 developed by other, different SDPs 106) with the framework 102. A single SDP 106 may develop and register two or more distinct and/or different agents 112 with the framework 102, for example different agents 112 to access different data in the data store 104 of interest to the same SDP 106.

An SDP 106 may access the data store 104, via its data propagation agent 112 executing in the runtime sandbox 110 of the data propagation agent framework 102, to perform data mining functions. For example, the SDP 106 may analyze data regarding purchasing and/or content consumption of users and/or subscribers of a wireless communication system to evaluate the desirability of paying to present a specific advertisement or other information content in a display window of a wireless communication device of a user (e.g., targeted advertising). A user with a history of having browsed on-line wilderness trail descriptions may be more disposed to act on an advertisement for hiking boots than another user with no such history. Notwithstanding this specific use case, it is understood that the advantages of the federated data distribution system 100 described herein are not limited to a targeted advertisement application. For example, the data store 104 may comprise a large database of health records, and the SDPs 106 may mine the data store 104 to perform independent epidemiological investigations.

The data discovery component 118 provides an API that provides SDPs 106 and/or the agents 112 a controlled, structured mechanism for determining the kind of data that is accessible to them from the data store 104. The data discovery component 118 may provide information about the types of data available from the data store 104. The data discovery component 118 may provide an API that supports a request message to discover data collection types, a request message to discover data collections, a request message to discover data key types, a request message to discover data keys, and other request messages. Different SDPs 106 may be allowed to access different data and/or categories of data, and hence the same discovery calls executed by different SDPs 106 may return different results to different SDPs 106. For example, a first SDP 106 may be allowed to access a broader or more extensive selection of data in the data store 104 than a second SDP 106, for example when the first SDP 106 has negotiated with the framework 102 to enjoy a higher class of service than did the second SDP 106.

The agent registry 124 provides an API that allows SDPs 106 to register and to provide an execution handle for one or more data propagation agents 112. The API may provide an argument for defining how many parallel instances of its agent 112 the SDP 106 wishes to be executed concurrently as well as other execution mode preferences. For example, the API may allow an SDP 106 to select how the framework 102 should handle the case when the requested number of parallel instances of the agent 112 cannot be scheduled to execute concurrently: for example, to wait to schedule running any instances of a particular agent 112 until all the requested parallel instances of the particular agent 112 can be run concurrently or to schedule fewer than requested but as many instances of the particular agent 112 as possible. The agent configuration manager 116 may act on the registration information contained in the agent registry 124 to instantiate agents 112 and to configure the services and/or privileges available to each agent 112 in the runtime sandbox 110. In part, the agent configuration manager 116 may configure data store 104 access policies for each agent 112 and/or execution privileges for each agent 112.

The agent scheduler 122 schedules data propagation agents 112 to run based on policy and/or service level agreements to achieve equitable access to the data store 104. The agent scheduler 122 may access a list of agent instances maintained by the agent registry 124 to know when and what agents 112 to execute.

The data access broker 120 establishes communication links with the data store 104 via the network 108. When a data propagation agent 112 executes a data access API extended by the data access broker 120, the data access broker 120 requests the identified data from the data store 104, subject to any access constraints defined by policy or otherwise for the subject agent 112. The data returned to the agents 112 may be said to be schema-less data, in the sense that no specific structure may be imposed by the agents 112 on the format of data returned to the agents 112. Said in other words, the agents 112 are not enabled to define the structure of the data that is returned to them. The data may be returned to the agents 112 as a marked text document, for example as a JavaScript object notation (JSON) document. Because the agents 112 do not establish (are not allowed by the framework 102 to establish) communication links to the data store 104, the risk that the agents 112 might block access of others to the data store 104, corrupt data in the data store 104, or access data in the data store 104 to which they are not entitled is avoided. The agents 112 are restricted from direct access to the APIs of the data store 104, for example the agents 112 are restricted from direct access to representational state transfer (REST) APIs of the data store 104. The restriction of the agents 112 from access to the APIs of the data store 104 may be referred to in some contexts as decoupling the agents from the data store 104.

Figure 2:
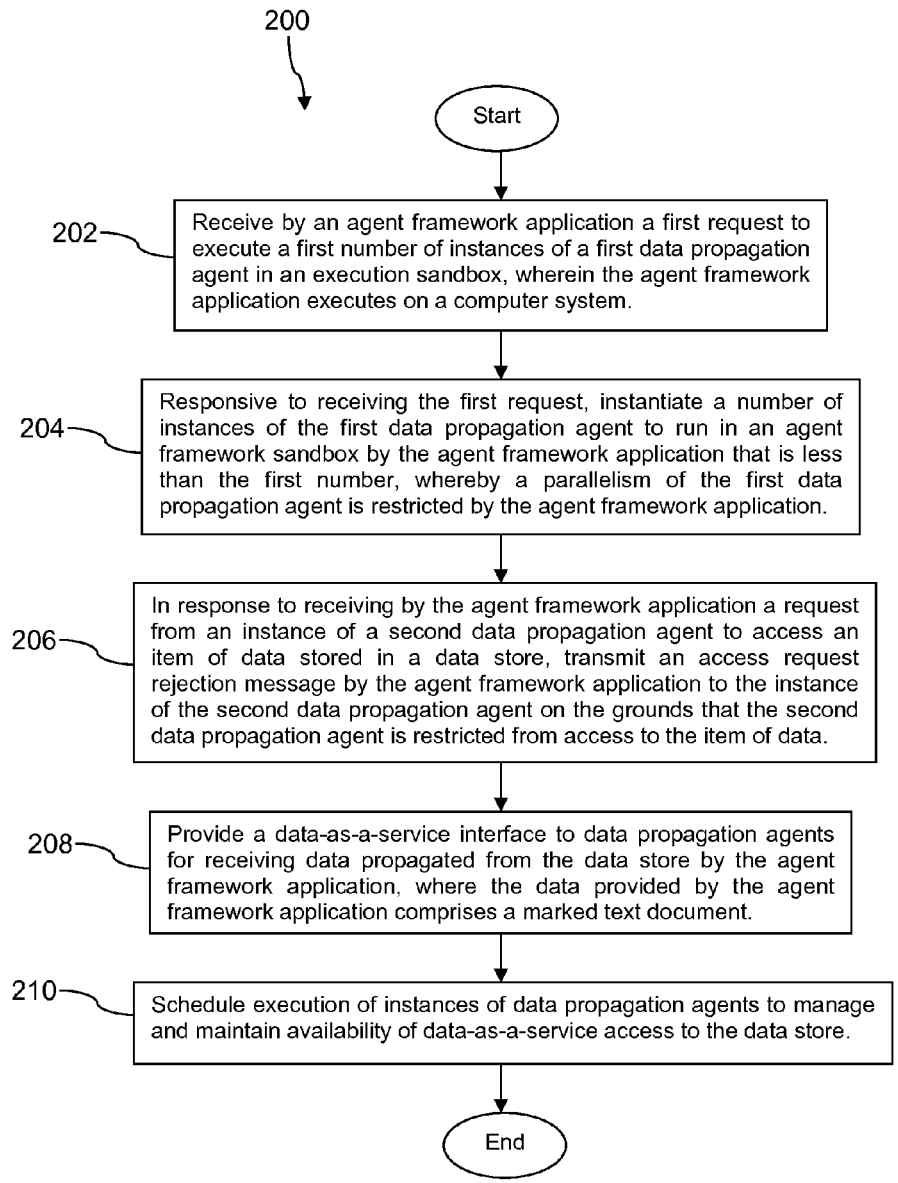
FIG. 2 is a flow chart of a method according to an embodiment of the disclosure.

Turning now to FIG. 2, a method 200 is described. At block 202, an agent framework application receives a first request to execute a first number of instances of a first data propagation agent in an execution sandbox, wherein the agent framework application executes on a computer system. For example, the agent configuration manager 116, the agent registry 124, or the agent scheduler 122 receives the first request. At block 204, responsive to receiving the first request, the agent framework application instantiates a number of instances of the first data propagation agent to run in an agent framework sandbox that is less than the first number, whereby a parallelism of the first data propagation agent is restricted by the agent framework application. For example, the agent configuration manager 116 or the agent scheduler 122 instantiates the instances of the first data propagation agent. At block 206, in response to receiving by the agent framework application a request from an instance of a second data propagation agent to access an item of data stored in a data store, the agent framework application transmits an access request rejection message to the instance of the second data propagation agent on the grounds that the second data propagation agent is restricted from access to the item of data. For example, the agent configuration manager 116, the agent scheduler 122, or the agent registry 124 transmits the rejection message.

At block 208, the agent framework application provides a data-as-a-service interface to data propagation agents for receiving data propagated from the data store, where the data provided by the agent framework application comprises a marked text document. For example, the data discovery component 118 and/or the data access broker 120 provide the data-as-a-service interface to the data propagation agents. At block 210, the agent framework application schedules execution of instances of data propagation agents to manage and maintain availability of data-as-a-service access to the data store. For example, the agent scheduler 122 schedules execution of instances of data propagation agents.

Figure 3:
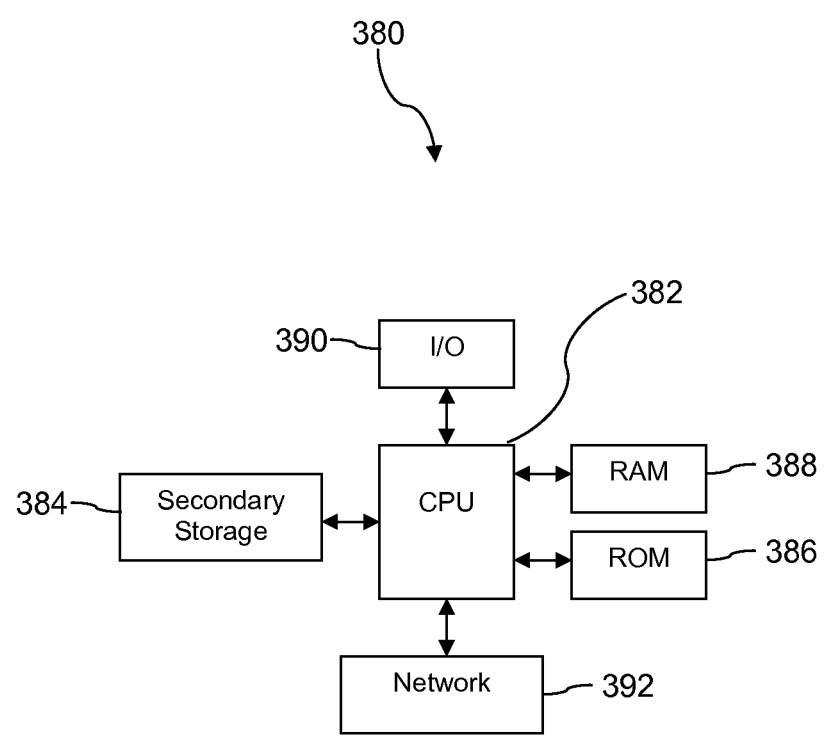
FIG. 3 is a block diagram of a computer system according to an embodiment of the disclosure.

FIG. 3 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of propagating data from a data store, comprising:
  receiving by an agent framework application a first request to execute a first number of instances of a first data propagation agent in an execution sandbox, wherein the agent framework application executes on a computer system;
  responsive to receiving the first request, instantiating a number of instances of the first data propagation agent to run in an agent framework sandbox by the agent framework application that is less than the first number, whereby a parallelism of the first data propagation agent is restricted by the agent framework application;

in response to receiving by the agent framework application a request from an instance of a second data propagation agent to access an item of data stored in a data store, transmitting an access request rejection message by the agent framework application to the instance of the second data propagation agent on the grounds that the second data propagation agent is restricted from access to the item of data;

providing a data-as-a-service interface to data propagation agents for receiving data propagated from the data store by the agent framework application, where the data provided by the agent framework application comprises a marked text document;

scheduling execution of instances of data propagation agents by the agent framework application to manage and maintain availability of data-as-a-service access to the data store; and providing information about types of data available in the data store to data propagation agents based on discovery request messages received from the data propagation agents, wherein the discovery request messages comprise one of a request message to discover data collection types, a request message to discover data collections, a request message to discover data key types, and a request message to discover data keys.

2. The method of claim 1, wherein the agent framework application decouples the data propagation agents from the data store.

3. The method of claim 1, wherein the agent framework application supports federated data distribution to the data propagation agents.

4. The method of claim 1, further comprising establishing data communication links to the data store by the agent framework application while restricting the data propagation agents from establishing data communication links to the data store.

5. The method of claim 1, wherein the marked text document is a JavaScript object notation (JSON) document.

\* \* \* \* \*